(12) United States Patent
Miftakhov et al.

(10) Patent No.: US 11,858,647 B2
(45) Date of Patent: Jan. 2, 2024

(54) MANAGING HYDROGEN FUEL IN HYDROGEN FUEL CELL-POWERED AIRCRAFT

(71) Applicant: ZeroAvia, Inc., Hollister, CA (US)

(72) Inventors: Valery Miftakhov, San Carlos, CA (US); Gabriel Devault, Watsonville, CA (US)

(73) Assignee: ZeroAvia, Inc., Hollister, CA (US)

( * ) Notice: Subject to any disclaimer, the term of this patent is extended or adjusted under 35 U.S.C. 154(b) by 0 days.

(21) Appl. No.: 17/656,878

(22) Filed: Mar. 28, 2022

(65) Prior Publication Data

US 2022/0324583 A1 Oct. 13, 2022

Related U.S. Application Data

(60) Provisional application No. 63/168,698, filed on Mar. 31, 2021.

(51) Int. Cl.

| | |
|---|---|
| *B60L 53/20* | (2019.01) |
| *B60L 58/30* | (2019.01) |
| *B64D 7/04* | (2006.01) |
| *H01M 8/04089* | (2016.01) |
| *H01M 8/04082* | (2016.01) |
| *H01M 8/04746* | (2016.01) |
| *B64D 37/30* | (2006.01) |
| *B64D 37/04* | (2006.01) |

(52) U.S. Cl.
CPC .............. *B64D 37/30* (2013.01); *B60L 53/20* (2019.02); *B60L 58/30* (2019.02); *B64D 37/04* (2013.01); *H01M 8/04089* (2013.01); *H01M 8/04201* (2013.01); *H01M 8/04208* (2013.01); *H01M 8/04753* (2013.01); *B60L 2200/10* (2013.01); *B64D 2221/00* (2013.01); *H01M 2250/20* (2013.01)

(58) Field of Classification Search
None
See application file for complete search history.

(56) References Cited

U.S. PATENT DOCUMENTS

2005/0224514 A1* 10/2005 Westenberger ........... F17C 1/00
222/3
2009/0226772 A1* 9/2009 Stark .................... H01M 8/0662
141/285

(Continued)

FOREIGN PATENT DOCUMENTS

| CN | 109367809 A | * | 2/2019 |
|---|---|---|---|
| WO | 2022216474 A1 | | 10/2022 |

OTHER PUBLICATIONS

ISA/EP, International Search Report and Written Opinion for International Application No. PCT/US2022/022278, 12 pages, dated Sep. 22, 2022.

*Primary Examiner* — Jared Fureman
*Assistant Examiner* — Joel Barnett

(57) ABSTRACT

Method and system for managing hydrogen fuel in hydrogen fuel cell-powered aircraft is disclosed. The method identifies unused hydrogen fuel in a fuel tank of the aircraft. Determines an amount of the unused hydrogen fuel in the fuel tank of the aircraft. Transfers the amount of the unused hydrogen fuel from the fuel tank of the aircraft into a hydrogen fuel cell of the aircraft and converts the amount of the unused hydrogen fuel into electricity via the hydrogen fuel cell of the aircraft.

20 Claims, 3 Drawing Sheets

(56) References Cited

U.S. PATENT DOCUMENTS

| | | | | |
|---|---|---|---|---|
| 2012/0119573 A1* | 5/2012 | Turudic | ............... | B60L 58/21 |
| | | | | 318/400.3 |
| 2016/0137304 A1 | 5/2016 | Phan et al. | | |
| 2019/0176640 A1* | 6/2019 | Lee | ................ | B60K 35/00 |
| 2021/0151783 A1* | 5/2021 | Miftakhov | ........ | H01M 8/04738 |

* cited by examiner

ID

US 11,858,647 B2

MANAGING HYDROGEN FUEL IN HYDROGEN FUEL CELL-POWERED AIRCRAFT

CROSS-REFERENCE TO RELATED APPLICATIONS (PROVISIONAL)

This application claims priority to and benefit of U.S. Provisional Patent Application No. 63/168,698 filed on Mar. 31, 2021, entitled "METHODS OF MANAGING HYDROGEN FUEL IN HYDROGEN FUEL CELL-POWERED AIRCRAFT" by Miftakhov et al., and assigned to the assignee of the present application, the disclosure of which is hereby incorporated by reference in its entirety.

FIELD OF THE INVENTION

Embodiments of the present technology relate generally to hydrogen fuel cell-powered aircraft and, more specifically, to systems and methods for managing excess hydrogen fuel in hydrogen fuel cell-powered aircraft.

BACKGROUND

Hydrogen fuel often is in the form of cryogenic liquid hydrogen or gaseous hydrogen. Storage of either of these types of hydrogen fuels may be challenging because hydrogen fuel may leak from its container, rapidly boil off, and/or dissipate from some other process. In addition, the use of hydrogen fuel cell technology presents alternative or additional challenges not encountered in conventionally powered aircraft design. Therefore, there is a need for better methods of managing excess or leftover hydrogen fuel of a hydrogen-powered aircraft.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Figure 1:
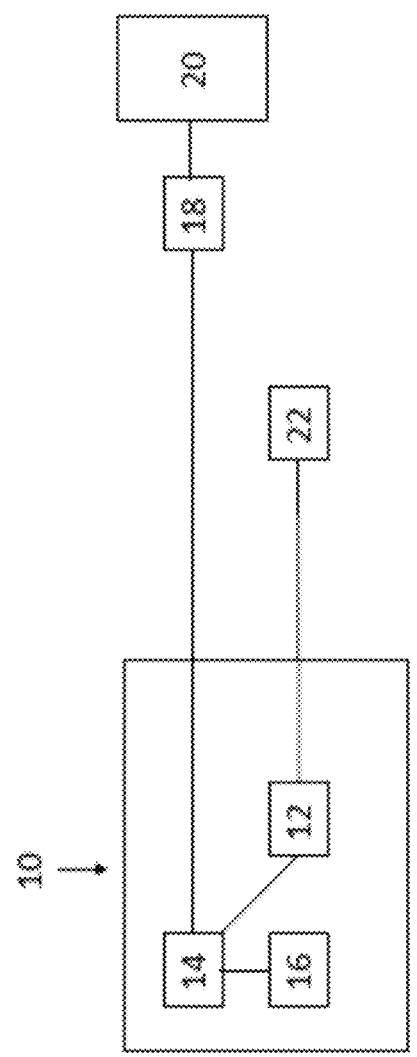
FIG. 1 is a schematic illustration of a hydrogen fuel cell-powered aircraft shown in communication with a local power grid of an airport, in accordance with an embodiment.

Referring to FIG. 1, a hydrogen fuel cell-powered aircraft 10 is illustrated and generally includes a hydrogen fuel cell-powered electric engine system including a fuel source or tank 12 for storing hydrogen fuel (e.g., cryogenic hydrogen fuel or gaseous hydrogen fuel), a hydrogen fuel cell 14 in fluid communication with the fuel source 12, and a motor assembly 16 disposed in electrical communication with the fuel cell 14. The fuel source 12 may store, for example, hydrogen fuel cryogenically (e.g., as liquid hydrogen or cold hydrogen gas) and is operatively coupled to a heat exchanger via a pump, which pumps the fuel from fuel source 12 to the heat exchanger for conditioning the compressed air. In particular, the hydrogen fuel, while in the heat exchanger, becomes gasified; the hydrogen gas is heated in the heat exchanger to a working temperature of the fuel cell 14, which also takes heat out of the compressed air, enabling control of flow through the heat exchanger.

The fuel cell 14 may be in the form of a proton-exchange membrane fuel cell (PEMFC) or other suitable fuel cell stack capable of converting chemical energy liberated during the electrochemical reaction of hydrogen and oxygen to electrical energy (e.g., direct current). Water vapor is exhausted from the fuel cell 14 to an exhaust system.

The electrical energy generated from fuel cell 14 is transmitted to the motor assembly 16, which is configured to convert the direct current to alternating current for actuating one or more of a plurality of motors of the motor assembly 16. The motor assembly 16 is configured to drive (e.g., rotate) a drive shaft in response to the electrical energy received from fuel cell 14 for operating the components on the drive shaft, thereby powering the aircraft 10 and the components thereof.

For a more detailed description of a hydrogen fuel cell-powered aircraft 10 and/or components thereof, one or more of which can be included, or modified for use with the systems and methods of this disclosure, reference can be made to U.S. patent application Ser. No. 16/950,735, filed Nov. 17, 2020, the entire contents of which are hereby incorporated by reference herein.

Under certain circumstances, there may be leftover or unused fuel in the fuel tank 12, for example, after a flight, if a flight is cancelled, etc. Under such a scenario, it may be desirable to decant or offload the remaining fuel from the fuel tank 12 because maintaining the hydrogen fuel in the fuel tank 12 may result in losses (e.g., due to rapid boil-off of the hydrogen fuel, leaks, etc.) and/or may be costly to maintain the proper storage conditions for the hydrogen fuel on the aircraft 10.

Figure 2:
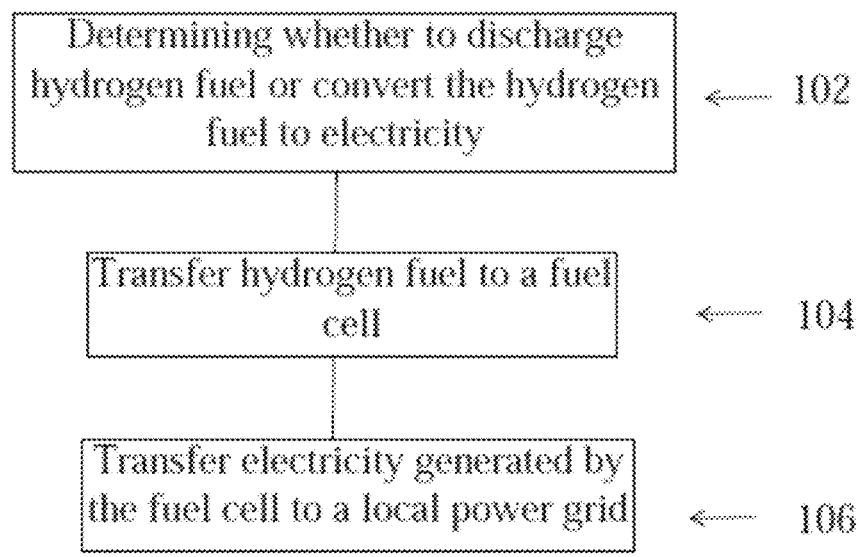
FIG. 2 is a flow chart illustrating a method of managing excess hydrogen fuel stored in the aircraft of FIG. 1, in accordance with an embodiment.

Accordingly, with reference to FIG. 2, a method of managing the remaining hydrogen fuel is provided.

At step 102, one embodiment electrically connects the fuel cell 14 to a local electrical grid 20 located at an airport or fluidly coupling the fuel tank 12 to an external storage container 22 at the airport. When it is determined it would be more cost-effective or otherwise preferential to transfer the leftover hydrogen fuel, the hydrogen fuel is then transferred directly from the fuel tank 12 to the external storage container 22 to be used at a later time.

If electrically connecting the fuel cell 14 to the local electrical grid 20 is determined to be more cost-effective or otherwise preferred, a power cable is coupled at one end to the fuel tank 12 and coupled at another end to the local power grid 20.

At step 104, the fuel tank 12 is configured to transfer the hydrogen fuel to the fuel cell 14, whereby the fuel cell 14 converts the hydrogen fuel into electricity.

At step 106, instead of transferring the electricity from the fuel cell 14 to the motor assembly 16, the fuel cell 14 is configured, via a computer processor (such as described in FIG. 3), to transfer the electricity to the local power grid 20 via the power cable that extends from the fuel cell 14 and out of the aircraft 10. The fuel cell 14 may include a diverter that diverts the electricity from the motor assembly 16 to the local power grid 20. In one embodiment, the electricity may be inverted from DC current to AC current via an inverter 18 coupled between the fuel cell 14 and the local power grid 20. In one embodiment, the aircraft 10 may be equipped with the inverter 18.

In one embodiment, the aircraft 10 may be flown to an airport experiencing a natural disaster and/or has a power outage and may be used to generate and provide electricity to the local airport or any other location needing power.

Figure 3:
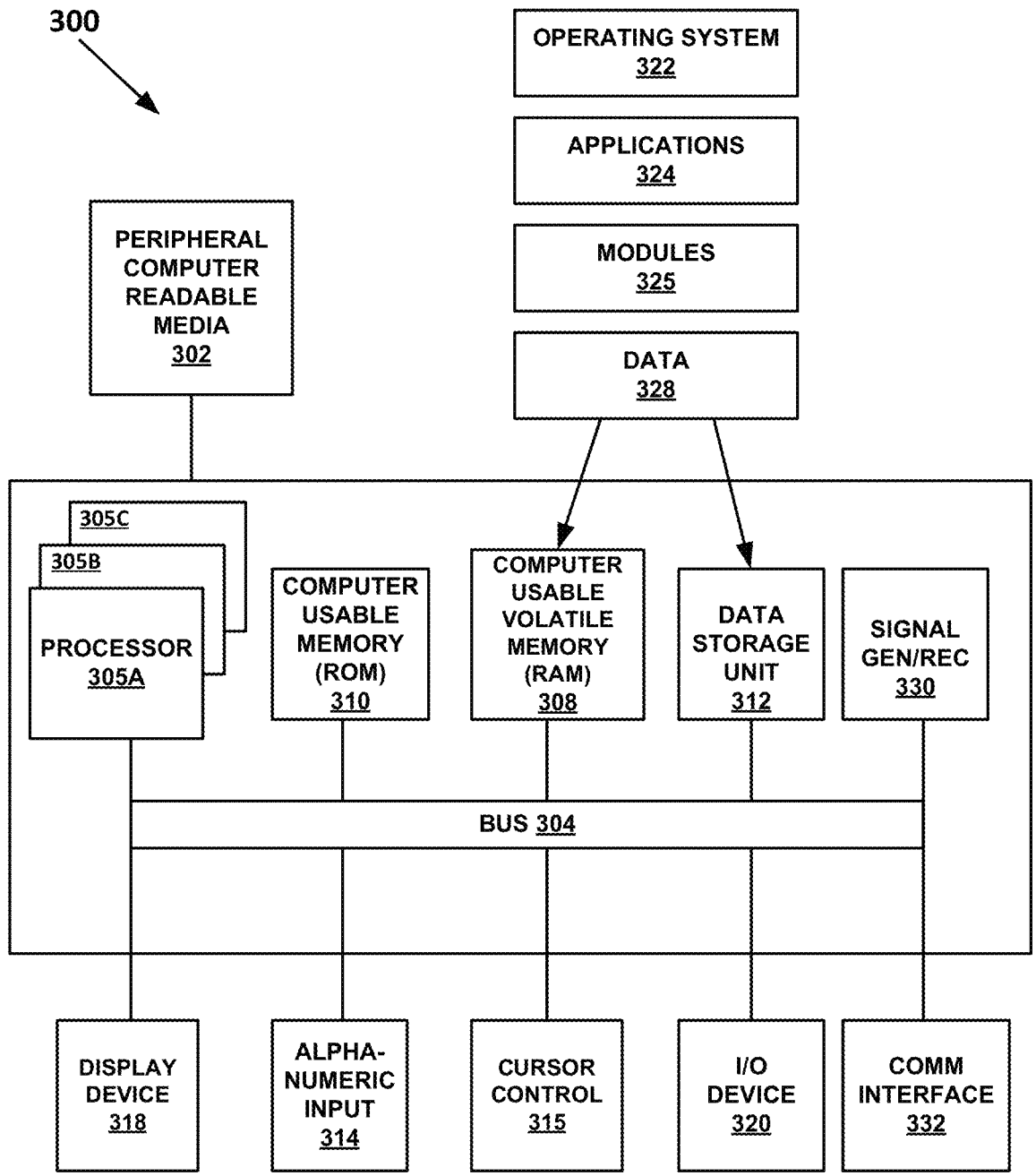
FIG. 3 is a block diagram of a computer system, in accordance with an embodiment.

With reference now to FIG. 3, an example computer system 300 is shown. In the following discussion, computer system 300 is representative of a system or components that may be used with aspects of the present technology. In one embodiment, different computing environments will only use some of the components shown in computer system 300.

In general, embodiments described herein can include some or all of the components of computer system 300. In different embodiments, components can include communication capabilities (e.g., wired such as ports or the like, and/or wirelessly such as near field communication, Bluetooth, WiFi, or the like) such that some of the components of computer system 300 are found in one location while other components could be ancillary but communicatively coupled thereto. In one embodiment, the programming includes computer-readable and computer-executable instructions that reside, for example, in non-transitory computer-readable medium (or storage media, etc.) of computer system 300.

In one embodiment, computer system 300 includes peripheral computer readable media 302 which can include media such as, for example, an external storage drive, a compact disc, a flash memory, a universal serial bus (USB) flash memory, secure digital (SD) memory, MultiMediaCard (MMC) memory, an extreme Digital (XD) memory, a CompactFlash memory, a MemoryStick memory, a SmartMedia memory, and the like. In one embodiment, computer system 300 also includes an address/data/control bus 304 for communicating information, and a processor 305A coupled to bus 304 for processing information and instructions. As depicted in FIG. 3, computer system 300 is also well suited to a multi-processor environment in which a plurality of processors 305A, 305B, and 305C are present. Conversely, computer system 300 is also well suited to having a single processor such as, for example, processor 305A. Processors 305A, 305B, and 305C may be any of various types of microprocessors. Computer system 300 also includes data storage features such as a computer usable volatile memory 308, e.g., random access memory (RAM), coupled to bus 304 for storing information and instructions for processors 305A, 305B, and 305C.

Computer system 300 also includes computer usable non-volatile memory 310, e.g., read only memory (ROM), coupled to bus 304 for storing static information and instructions for processors 305A, 305B, and 305C. Also present in computer system 300 is a data storage unit 312 (e.g., a magnetic disk drive, optical disk drive, solid state drive (SSD), and the like) coupled to bus 304 for storing information and instructions. Computer system 300 also can optionally include an alpha-numeric input device 314 including alphanumeric and function keys coupled to bus 304 for communicating information and command selections to processor 305A or processors 305A, 305B, and 305C. Computer system 300 also can optionally include a cursor control device 315 coupled to bus 304 for communicating user input information and command selections to processor 305A or processors 305A, 305B, and 305C. Cursor control device may be a touch sensor, gesture recognition device, and the like. Computer system 300 of the present embodiment can optionally include a display device 318 coupled to bus 304 for displaying information.

Referring still to FIG. 3, display device 318 of FIG. 3 may be a liquid crystal device, cathode ray tube, OLED, plasma display device or other display device suitable for creating graphic images and alpha-numeric characters recognizable to a user. Cursor control device 315 allows the computer user to dynamically signal the movement of a visible symbol (cursor) on a display screen of display device 318. Many implementations of cursor control device 315 are known in the art including a trackball, mouse, touch pad, joystick, non-contact input, gesture recognition, voice commands, bio recognition, and the like. In addition, special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

Computer system 300 is also well suited to having a cursor directed by other means such as, for example, voice commands. Computer system 300 also includes an I/O device 320 for coupling computer system 300 with external entities. For example, in one embodiment, I/O device 320 is a modem for enabling wired or wireless communications between computer system 300 and an external network such as, but not limited to, the Internet or intranet.

Referring still to FIG. 3, various other components are depicted for computer system 300. Specifically, when present, an operating system 322, applications 324, modules 325, and data 328 are shown as typically residing in one or some combination of computer usable volatile memory 308, e.g. random-access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the Internet. The present technology may be applied to one or more elements of described computer system 300.

Computer system 300 also includes one or more signal generating and receiving device(s) 330 coupled with bus 304 for enabling computer system 300 to interface with other electronic devices and computer systems. Signal generating and receiving device(s) 330 of the present embodiment may include wired serial adaptors, modems, and network adaptors, wireless modems, and wireless network adaptors, and other such communication technology. The signal generating and receiving device(s) 330 may work in conjunction with one (or more) communication interface 332 for coupling information to and/or from computer system 300. Communication interface 332 may include a serial port, parallel port, Universal Serial Bus (USB), Ethernet port, Bluetooth, thunderbolt, near field communications port, WiFi, Cellular modem, or other input/output interface. Communication interface 332 may physically, electrically, optically, or wirelessly (e.g., via radio frequency) couple computer system 300 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of managing hydrogen fuel for a non-flying aircraft, said method comprising:
   identifying unused hydrogen fuel in a fuel tank of said non-flying aircraft;
   determining an amount of said unused hydrogen fuel in said fuel tank of said non-flying aircraft;
   determining whether transferring said amount of unused said unused hydrogen fuel in said fuel tank of said non-flying aircraft to an external storage container or whether converting said amount of said unused hydrogen fuel into electricity via said hydrogen fuel cell of said non-flying aircraft is appropriate;
   provided said transferring of said amount of unused said unused hydrogen fuel in said fuel tank of said non-flying aircraft to said external storage container is appropriate, transferring said amount of unused said unused hydrogen fuel in said fuel tank of said non-flying aircraft to said external storage container; and
   provided said converting of said amount of said unused hydrogen fuel into electricity via said hydrogen fuel cell of said non-flying aircraft is appropriate, transferring said amount of said unused hydrogen fuel from said fuel tank of said non-flying aircraft into a hydrogen fuel cell of said non-flying aircraft and converting said amount of said unused hydrogen fuel into electricity via said hydrogen fuel cell of said non-flying aircraft.

2. The method of claim 1, further comprising:
   transferring said electricity from said hydrogen fuel cell of said non-flying aircraft to an external power grid.

3. The method of claim 1, further comprising:
   transferring said electricity from said hydrogen fuel cell of said non-flying aircraft to a power inverter;
   utilizing said power inverter to change said electricity from direct current to alternating current; and
   transferring said electricity from said power inverter to an external power grid.

4. The method of claim 3, wherein said power inverter is located on said non-flying aircraft.

5. The method of claim 3, wherein said power inverter is located external of said non-flying aircraft.

6. The method of claim 1, wherein said unused hydrogen fuel is gaseous hydrogen fuel.

7. The method of claim 1, wherein said unused hydrogen fuel is cryogenic hydrogen fuel.

8. A method of managing hydrogen fuel of a hydrogen fuel cell-powered aircraft, said method comprising:
   identifying unused hydrogen fuel in a fuel tank of said hydrogen fuel cell-powered aircraft;
   determining an amount of said unused hydrogen fuel in said fuel tank of said hydrogen fuel cell-powered aircraft;
   determining whether transferring said amount of unused said unused hydrogen fuel in said fuel tank of said hydrogen fuel cell-powered aircraft to an external storage container or whether converting said amount of said unused hydrogen fuel into electricity via said hydrogen fuel cell of said hydrogen fuel cell-powered aircraft is appropriate;
   provided said transferring of said amount of unused said unused hydrogen fuel in said fuel tank of said hydrogen fuel cell-powered aircraft to said external storage container is appropriate, transferring said amount of unused said unused hydrogen fuel in said fuel tank of said hydrogen fuel cell-powered aircraft to said external storage container; and
   provided said converting of said amount of said unused hydrogen fuel into electricity via said hydrogen fuel cell of said hydrogen fuel cell-powered aircraft is appropriate, transferring said amount of said unused hydrogen fuel from said fuel tank of said hydrogen fuel cell-powered aircraft into a hydrogen fuel cell of said hydrogen fuel cell-powered aircraft and converting said amount of said unused hydrogen fuel into electricity via said hydrogen fuel cell of said hydrogen fuel cell-powered aircraft.

9. The method of claim 8, wherein said transferring said amount of said unused hydrogen fuel from said fuel tank of said hydrogen fuel cell-powered aircraft to a storage container external to said hydrogen fuel cell-powered aircraft further comprises:
   discharging said amount of said unused hydrogen fuel from said fuel tank of said hydrogen fuel cell-powered aircraft to said storage container external to said hydrogen fuel cell-powered aircraft.

10. The method of claim 8, wherein said unused hydrogen fuel is gaseous hydrogen fuel.

11. The method of claim 8, wherein said unused hydrogen fuel is cryogenic hydrogen fuel.

12. The method of claim 8, wherein said storage container external to said hydrogen fuel cell-powered aircraft comprises:
    a storage container located within another hydrogen fuel cell-powered aircraft.

13. The method of claim 8, wherein storage container external to said hydrogen fuel cell-powered aircraft comprises:

a fuel tank located within another hydrogen fuel cell-powered aircraft.

14. A method of managing hydrogen fuel for a hydrogen fuel cell-powered aircraft, said method comprising:
   identifying unused hydrogen fuel in a fuel tank of said hydrogen fuel cell-powered aircraft;
   determining an amount of said unused hydrogen fuel in said fuel tank of said hydrogen fuel cell-powered aircraft;
   transferring a first portion of said amount of said unused hydrogen fuel from said fuel tank of said hydrogen fuel cell-powered aircraft to a storage container external to said hydrogen fuel cell-powered aircraft;
   transferring a remainder of said amount of said unused hydrogen fuel from said fuel tank of said hydrogen fuel cell-powered aircraft into a hydrogen fuel cell of said hydrogen fuel cell-powered aircraft; and
   converting said remainder of said amount of said unused hydrogen fuel into electricity via said hydrogen fuel cell of said hydrogen fuel cell-powered aircraft.

15. The method of claim 14, further comprising:
   transferring said electricity from said hydrogen fuel cell of said hydrogen fuel cell-powered aircraft to an external power grid.

16. The method of claim 14, further comprising:
   transferring said electricity from said hydrogen fuel cell of said hydrogen fuel cell-powered aircraft to a power inverter;
   utilizing said power inverter to change said electricity from direct current to alternating current; and
   transferring said electricity from said power inverter to an external power grid.

17. The method of claim 16, wherein said power inverter is located on said hydrogen fuel cell-powered aircraft.

18. The method of claim 16, wherein said power inverter is located external of said hydrogen fuel cell-powered aircraft.

19. The method of claim 14, wherein said storage container external to said hydrogen fuel cell-powered aircraft comprises:
   a storage container located within another hydrogen fuel cell-powered aircraft.

20. The method of claim 14, wherein said unused hydrogen fuel is selected from a group consisting of a gaseous hydrogen fuel and a cryogenic hydrogen fuel.

\* \* \* \* \*